United States Patent Office 2,848,488
Patented Aug. 19, 1958

2,848,488
CRYSTALLIZATION OF PHTHALIC ACIDS

Chester M. Himel, Menlo Park, and Lester P. Berriman, Palo Alto, Calif., assignors to Richfield Oil Corporation, Los Angeles, Calif., a corporation of Delaware No Drawing. Application May 18, 1954
Serial No. 430,747

5 Claims. (Cl. 260—525)

This invention relates to the crystallization of phthalic acids. More specifically, our invention is concerned with a process for crystallizing isophthalic and terephthalic acids and their mixtures. One source of such phthalic acids or mixtures of phthalic acids is the product being continuously discharged under elevated temperature and pressure from the liquid phase nitric acid oxidation of suitable charge stocks such as xylenes or toluic acids.

When phthalic acids are produced under continuous processing conditions by the liquid phase nitric acid oxidation of suitable feed stocks, such as the corresponding toluic acids and xylenes, the product issues from the oxidation reaction either in complete solution or as a slurry containing a portion of the phthalic acids as crystalline solids. If the product solution has been cooled at an uncontrolled rate, then the phthalic acids contain micro-crystalline solids which are exceedingly difficult to filter. These microcrystalline solids are not only objectionable from the standpoint of filtration, but they have other undesirable properties, such as the development of static electricity when dred and crushed, appearance of color during the drying operation and adsorption of impurities and thus are difficult to handle in subsequent processing.

We have found that these difficulties can be largely circumvented if the phthalic acid products are subjected to a specific time-temperature program which is more fully described below. The resulting crystalline product does not exhibit objectionable electrostatic properties, is readily filtered and does not discolor on drying. In the continuous liquid phase nitric acid oxidation of phthalic acid precursors, e. g. toluic acids and xylenes, the product is removed continuously from the reaction zone at superatmospheric pressure and elevated temperature. We have found that if the temperature of the reaction mixture be reduced by controlled release of pressure, the phthalic acid crystals will then be of the desired size and will not exhibit the undesirable properties noted above. The present invention is applicable to phthalic acids derived by continuous liquid phase nitric acid oxidations conducted at temperatures from about 160 to 250° C. in reactions producing terephthalic acid and mixtures with isophthalic acid and from about 150 to 250° C. in reactions producing isophthalic acid in the absence of terephthalic acid. Our process is effective in crystallizing terephthalic acid, isophthalic acid, mixtures of these isomers, and mixtures of either or both of these isomers with orthophthalic acid. In crystallizing mixtures containing only orthophthalic acid, we have not found it necessary to control the cooling rate of the reaction mixture. This acid crystallizes at temperatures within the range of about 40 to 95° C.

An essential condition to be controlled in our crystallization process is the rate of cooling of the phthalic acid reaction mixture. If the desired results be obtained, the reaction mixture must be maintained within specified temperatures for a specified time period and be allowed to cool, preferably by flashing of the reaction medium through release of pressure, only at rates that will not destroy the necessary time-temperature sequence. The temperatures to be maintained in our process and thus the rates of cooling are dependent upon the particular isomer or combination of isomers present in the phthalic acid product.

In crystallizing terephthalic acid or mixtures of terephthalic acid with orthophthalic acid, the temperature of the reaction medium must be maintained within the range from about 190 to 160° C. for a minimum of two minutes before being cooled to room temperature. If the terephthalic acid be in admixture with isophthalic acid, the reaction mixture must not only be maintained at a temperature within the range from about 190 to 160° C. for a minimum of two minutes as noted above, but in addition it must be held at a temperature within the range from about 150 to 115° C. for a minimum of five minutes before being cooled to room temperature. When the phthalic acid is composed of isophthalic acid or isophthalic and orthophthalic acids, the reaction mixture need not remain above 160° C. for a given length of time. However, it must be held for a minimum of five minutes at a temperature within the range from about 150 to 115° C. before being cooled to room temperature. These limitations on the rate of cooling of the reaction mixture must be observed to obtain the desired results whether the reaction mixture be a complete solution or in slurry form.

The pressure of the reaction mixture issuing from the nitric acid oxidation will be sufficient to keep the mixture in the liquid phase at the reaction temperature. As noted, the temperature of the crystallization medium is preferably controlled by flashing the reaction mixture through release of the reaction pressure. The pressure to be maintained in the crystallization process is a function of the temperatures observed, and it must also be sufficient to keep the crystallizing medium in the liquid phase.

As noted, this invention is applicable to reaction mixtures containing a terephthalic acid, isophthalic acid, mixtures of these isomers, or either or both of these isomers admixed with orthophthalic acid. Among the specific mixtures which can be crystallized according to our process is one containing about 70% isophthalic acid and about 30% terephthalic acid derived from the liquid phase nitric acid oxidation of a feed containing corresponding amounts of meta- and paratoluic acids. Another phthalic acid which may be utilized contains about 60% isophthalic acid, about 20% terephthalic acid and about 20% orthophthalic acid and is derived through air oxidation of a xylene feed charge known as Solvent B which contains a xylene fraction having about 60% metaxylene, 20% paraxylene, and 20% orthoxylene and from about 8 to 16% ethyl benzene and 10 to 30% paraffins and naphthenes. The product of the air oxidation contains toluic acids corresponding to the xylenes in the charge, which acids are easily separated from the oxidation products of ethyl benzene, paraffins and naphthenes, and then converted to the desired mixture of phthalic acids by liquid phase nitric acid oxidation. The toluic acids may be oxidized to the corresponding phthalic acids by treating with nitric acid in the liquid phase at temperatures noted above with the nitric acid concentration being from about 1 to 15% of the total weight of the reaction mixture throughout the oxidation reaction.

The amounts of terephthalic or isophthalic acids or the relative amounts of terephthalic and isophthalic acids in our reaction mixtures are not critical but there should be at least a substantial amount present of either isophthalic or terephthalic acid when the mixture is considered to contain essentially only one of these isomers. Also, at least substantial amounts of terephthalic and isophthalic acids should be present when the reaction mixture is considered to be a mixture of these isomers. The ratio of isophthalic to terephthalic acid in the mixed reaction product is usually about 3:1 in parts by weight. When orthophthalic acid is present in the isophthalic and terephthalic acid mixture, the orthophthalic is usually not more than about 50% of the entire reaction mixture and the isophthalic to terephthalic acid ratio is about 3:1 in parts by weight.

The phthalic acids crystallized according to the present invention are withdrawn from the nitric acid oxidation reaction on a continuous basis. However, the crystallization of these acids from the reaction mixture may be conducted by either a batchwise or continuous procedure. After crystallization the desired phthalic acid product is separated from the nitric acid medium by conventional filtration methods.

The following examples are illustrative of our invention and are not to be considered limiting.

Example I

Toluic acids (70% meta, 30% para) were charged to a continuous nitric acid tower oxidation reactor at the rate of 800 grams per hour. The nitric acid was charged at the rate of 4 gallons per hour. The reactor was held at 200° C. and discharged continuously into a surge tank held at 180 to 185° C. The product from the surge tank was discharged intermittently into a pressure crystallizer. Pressure stability in the reactor system was maintained by nitrogen gas. The pressure in the crystallizer was released rapidly to 150 p. s. i. g. (185° C.) and then slowly over a two minute time cycle to 75 p. s. i. g. (160° C.); a second cycle was started at 55 p. s. i. g. (150° C.) in which the pressure was reduced to 10 p. s. i. g. (115° C.) over a 5-minute interval. The product was then discharged to an atmospheric pressure receiver and the total cycle repeated. The isophthalic and terephthalic acids were filtered, washed and dried.

All percentages mentioned above are calculated on a weight basis.

Example II

Paratoluic acid is charged to a continuous nitric acid tower oxidation reactor at the rate of 600 grams per hour. The nitric acid (10%) is charged at the rate of 4 gallons per hour. The reactor is held at 220° C. and discharged continuously into a surge tank held at 200° C. The product from the surge tank is discharged intermittently into a pressure crystallizer. Pressure stability in the reactor system is maintained by nitrogen gas. The pressure in the crystallizer is released rapidly to 200 p. s. i. g. (198° C.) and then slowly over a five-minute time cycle to 75 p. s. i. g. (160° C.) and then rapidly over a one-minute period to 10 p. s. i. g. (115° C.). The crystallizer contents are then blown down to an atmospheric pressure receiver and the total cycle repeated. The terephthalic acids are then filtered, washed and dried.

Example III

A mixture of toluic acid containing 60% metatoluic, 20% paratoluic and 20% orthotoluic acids are charged to a continuous nitric acid tower oxidation reactor at the rate of 900 grams per hour. The nitric acid (10%) is charged at the rate of 4 gallons per hour. The reactor is held at 210° C. and discharged continuously into a surge tank held at 185° C. The product in the surge tank is discharged intermittently into a pressure crystallizer. Pressure stability in the reactor system is maintained by nitrogen gas. The pressure in the crystallizer is released rapidly to 150 p. s. i. g. (185° C.) and then slowly over a two-minute time cycle to 75 p. s. i. g. (160° C.). A second cycle is then started at 55 p. s. i. g. (150° C.) in which the pressure is reduced to 10 p. s. i. g. (115° C.) over a five-minute interval. The product is then discharged to an atmospheric pressure receiver and the total cycle repeated. The phthalic acid product is filtered hot at 100° C. to recover the iso- and terephthalic acids and subsequently cooled to 40° C. to recover the major proportion of orthophthalic acid. Alternatively, the total mixture of phthalic acids can be recovered on cooling to 40° C. and filtering.

Example IV

Metatoluic acid is charged to a continuous nitric acid tower oxidation reactor at the rate of 480 grams per hour. The nitric acid (10%) is charged at the rate of four gallons per hour. The reactor is held at 220° C. and discharged continuously into a surge tank held at 200° C. The product from the surge tank is discharged intermittently into a pressure crystallizer. Pressure stability in the reactor system is maintained by nitrogen gas. The pressure in the crystallizer is released rapidly to 55 p. s. i. g. (150° C.) and then slowly over a five-minute time cycle to 10 p. s. i. g. (115° C.). The crystallizer contents are then blown down to an atmospheric pressure receiver and the total cycle repeated. The isophthalic acids are then filtered, washed and dried.

We claim:

1. The method of crystallizing in the liquid phase a mixture comprising terephthalic acid and isophthalic acid, which mixture is obtained as a continuous effluent from a liquid phase nitric acid oxidation reaction conducted at an elevated pressure and a temperature from about 160 to 250° C., which comprises continuously removing the effluent containing the phthalic acids from the oxidation reaction, cooling the effluent through release of pressure at a rate to maintain the effluent temperature within the range from about 190 to 160° C. for at least two minutes to effect crystallization of terephthalic acid, and then cooling the effluent through release of pressure at a rate to maintain the effluent temperature within the range from about 150 to 115° C. for at least five minutes to effect crystallization of isophthalic acid.

2. The method of crystallizing in the liquid phase terephthalic acid obtained as a continuous effluent from a liquid phase nitric acid oxidation reaction conducted at an elevated pressure and a temperature from about 160 to 250° C., which comprises continuously removing the effluent containing terephthalic acid from the oxidation reaction, and cooling the effluent through release of pressure at a rate to maintain the effluent temperature within the range from about 190 to 160° C. for at least two minutes to effect crystallization of terephthalic acid.

3. The method of crystallizing in the liquid phase isophthalic acid obtained as a continuous effluent from a liquid phase nitric acid oxidation reaction conducted at an elevated pressure and a temperature from about 150 to 250° C., which comprises continuously removing the effluent containing isophthalic acid from the oxidation reaction, and cooling the effluent through release of pressure at a rate to maintain the effluent temperature within the range from about 150 to 115° C. for at least five minutes to effect crystallization of isophthalic acid.

4. The method of crystallizing in the liquid phase a mixture comprising a phthalic acid fraction containing about 70% by weight of isophthalic acid and about 30% by weight of terephthalic acid, which mixture is obtained as a continuous effluent from a liquid phase nitric acid oxidation reaction conducted at an elevated pressure and a temperature from about 160 to 250° C., which comprises continuously removing the effluent containing the phthalic acids from the oxidation reaction, cooling the effluent through release of pressure at a rate to maintain the effluent temperature within the range from about 190 to 160° C. for at least two minutes to effect crystallization of terephthalic acid, and then cooling the effluent through release of pressure at a rate to maintain the effluent temperature within the range from about 150 to 115° C. for at least five minutes to effect crystallization of isophthalic acid.

5. The method of crystallizing in the liquid phase a mixture comprising a phthalic acid fraction containing about 60% by weight of isophthalic acid, about 20% by weight of terephthalic acid, and about 20% by weight of orthophthalic acid, which mixture is obtained as a continuous effluent from a liquid phase nitric acid oxidation reaction conducted at an elevated pressure and a temperature from about 160 to 250° C., which comprises continuously removing the effluent containing the phthalic acids from the oxidation reaction, cooling the effluent through release of pressure at a rate to maintain the effluent temperature within the range from about 190 to 160° C. for at least two minutes to effect crystallization of terephthalic acid, and then cooling the effluent through release of pressure at a rate to maintain the effluent temperature within the range from about 150 to 115° C. for at least five minutes to effect crystallization of isophthalic acid.

References Cited in the file of this patent

UNITED STATES PATENTS 2,734,914     McKinnis _____ Feb. 14, 1956